US008186580B2

(12) United States Patent
Cannon et al.

(10) Patent No.: US 8,186,580 B2
(45) Date of Patent: *May 29, 2012

(54) BIOMETRIC IDENTIFICATION DEVICE WITH SMARTCARD CAPABILITIES

(75) Inventors: Charles Cannon, Amissville, VA (US); Thomas Reigle, Woodbridge, VA (US)

(73) Assignee: Privaris, Inc., Charlottesville, VA (US)

( * ) Notice: Subject to any disclaimer, the term of this patent is extended or adjusted under 35 U.S.C. 154(b) by 280 days.

This patent is subject to a terminal disclaimer.

(21) Appl. No.: 12/251,131

(22) Filed: Oct. 14, 2008

(65) Prior Publication Data

US 2009/0095810 A1    Apr. 16, 2009

Related U.S. Application Data

(63) Continuation of application No. 11/389,387, filed on Mar. 24, 2006, now Pat. No. 7,481,364.

(60) Provisional application No. 60/665,043, filed on Mar. 24, 2005.

(51) Int. Cl.
*G06K 5/00* (2006.01)

(52) U.S. Cl. ...................................... 235/380

(58) Field of Classification Search ............... 235/380, 235/382, 487, 492
See application file for complete search history.

(56) References Cited

U.S. PATENT DOCUMENTS

| 4,993,068 | A | 2/1991  | Piosenka et al. |
| 5,053,608 | A | 10/1991 | Senanayake      |
| 5,131,038 | A | 7/1992  | Puhl et al.     |
| 5,280,527 | A | 1/1994  | Gullman et al.  |
| 5,469,506 | A | 11/1995 | Berson et al.   |
| 5,526,428 | A | 6/1996  | Arnold          |
| 5,591,949 | A | 1/1997  | Bernstein       |
| 5,594,227 | A | 1/1997  | Deo             |
| 5,613,012 | A | 3/1997  | Hoffman et al.  |
| 5,615,277 | A | 3/1997  | Hoffman         |
| 5,805,719 | A | 9/1998  | Pare, Jr. et al.|
| 5,818,029 | A | 10/1998 | Thomson         |

(Continued)

FOREIGN PATENT DOCUMENTS

EP    1 396 779 A2    3/2004

(Continued)

OTHER PUBLICATIONS

International Search Report and Written Opinion for PCT/US06/010910, mailed on Dec. 26, 2007; 8 pages.

(Continued)

*Primary Examiner* — Seung Lee

(57) ABSTRACT

A smartcard-enabled BPID Security Device integrates a smartcard reader with a biometric authentication component to provide secured access to electronic systems. The device allows for an individual to insert a smartcard into an aperture in the physical enclosure of the BPID Security Device, allowing the smartcard and the BPID Security Device to electronically communicate with each other. The smartcard-enabled BPID Security Device is based on a custom application specific integrated circuit that incorporates smartcard terminals, such that the BPID Security Device can communicate directly with an inserted smartcard. In an alternative embodiment of the invention, the smartcard-enabled BPID Security Device is based on a commercial off-the-shelf microprocessor, and may communicate with a commercial off-the-shelf microprocessor smartcard receiver using a serial, USB, or other type of communication protocol. The device allows for enrolling a user's credentials onto the smartcard-enabled BPID Security Device. The device also allows for authenticating an individual using the smartcard-enabled BPID Security Device.

28 Claims, 4 Drawing Sheets

U.S. PATENT DOCUMENTS

| | | | |
|---|---|---|---|
| 5,838,812 A | 11/1998 | Pare, Jr. et al. | |
| 5,870,723 A | 2/1999 | Pare, Jr. et al. | |
| 5,920,640 A | 7/1999 | Salatino et al. | |
| 5,952,641 A | 9/1999 | Korshun | |
| 5,991,408 A | 11/1999 | Pearson et al. | |
| 6,016,476 A | 1/2000 | Maes et al. | |
| 6,038,666 A | 3/2000 | Hsu et al. | |
| 6,041,410 A | 3/2000 | Hsu et al. | |
| 6,070,796 A | 6/2000 | Sirbu | |
| 6,084,968 A | 7/2000 | Kennedy et al. | |
| 6,154,879 A | 11/2000 | Pare, Jr. et al. | |
| 6,167,517 A | 12/2000 | Gilchrist et al. | |
| 6,181,803 B1 | 1/2001 | Davis | |
| 6,182,221 B1 | 1/2001 | Hsu et al. | |
| 6,185,316 B1 | 2/2001 | Buffam | |
| 6,219,439 B1 * | 4/2001 | Burger | 382/115 |
| 6,219,793 B1 | 4/2001 | Li et al. | |
| 6,268,788 B1 | 7/2001 | Gray | |
| 6,282,649 B1 | 8/2001 | Lambert et al. | |
| 6,317,834 B1 | 11/2001 | Gennaro et al. | |
| 6,353,889 B1 | 3/2002 | Hollingshead | |
| 6,366,682 B1 | 4/2002 | Hoffman et al. | |
| 6,367,017 B1 | 4/2002 | Gray | |
| 6,466,781 B1 | 10/2002 | Bromba et al. | |
| 6,484,260 B1 | 11/2002 | Scott et al. | |
| 6,487,662 B1 | 11/2002 | Kharon et al. | |
| 6,490,680 B1 | 12/2002 | Scheidt et al. | |
| 6,529,885 B1 | 3/2003 | Johnson | |
| 6,532,298 B1 | 3/2003 | Cambier et al. | |
| 6,581,161 B1 | 6/2003 | Byford | |
| 6,609,198 B1 | 8/2003 | Wood et al. | |
| 6,615,264 B1 | 9/2003 | Stoltz et al. | |
| 6,618,806 B1 | 9/2003 | Brown et al. | |
| 6,636,973 B1 | 10/2003 | Novoa et al. | |
| 6,641,009 B2 | 11/2003 | French et al. | |
| 6,657,538 B1 | 12/2003 | Ritter | |
| 6,662,166 B2 | 12/2003 | Pare, Jr. et al. | |
| 6,668,332 B1 | 12/2003 | McNeil | |
| 6,671,808 B1 | 12/2003 | Abbott et al. | |
| 6,681,034 B1 | 1/2004 | Russo | |
| 6,719,200 B1 | 4/2004 | Wiebe | |
| 6,728,881 B1 | 4/2004 | Karamchetty | |
| 6,735,695 B1 | 5/2004 | Gopalakrishnan et al. | |
| 6,751,734 B1 | 6/2004 | Uchida | |
| 6,757,411 B2 | 6/2004 | Chau | |
| 6,765,470 B2 | 7/2004 | Shinzaki | |
| 6,766,040 B1 | 7/2004 | Catalano et al. | |
| 6,775,776 B1 | 8/2004 | Vogt et al. | |
| 6,786,397 B2 | 9/2004 | Silverbrook et al. | |
| 6,819,219 B1 | 11/2004 | Bolle et al. | |
| 6,832,317 B1 | 12/2004 | Strongin et al. | |
| 6,836,843 B2 | 12/2004 | Seroussi et al. | |
| 6,839,688 B2 | 1/2005 | Drummond et al. | |
| 6,844,660 B2 | 1/2005 | Scott | |
| 6,848,052 B2 | 1/2005 | Hamid et al. | |
| 6,850,147 B2 | 2/2005 | Prokoski et al. | |
| 6,850,252 B1 | 2/2005 | Hoffberg | |
| 6,853,739 B2 | 2/2005 | Kyle | |
| 6,857,073 B2 | 2/2005 | French et al. | |
| 6,862,443 B2 | 3/2005 | Witte | |
| 6,870,946 B1 | 3/2005 | Teng et al. | |
| 6,870,966 B1 | 3/2005 | Silverbrook et al. | |
| 6,871,193 B1 | 3/2005 | Campbell et al. | |
| 6,871,287 B1 | 3/2005 | Ellingson | |
| 6,871,784 B2 | 3/2005 | Jayaratne | |
| 6,876,757 B2 | 4/2005 | Yau et al. | |
| 6,877,097 B2 | 4/2005 | Hamid et al. | |
| 6,879,243 B1 | 4/2005 | Booth et al. | |
| 6,879,966 B1 | 4/2005 | Lapsley et al. | |
| 6,880,749 B1 | 4/2005 | Green et al. | |
| 6,880,750 B2 | 4/2005 | Pentel | |
| 6,883,709 B2 | 4/2005 | Joseph | |
| 6,886,096 B2 | 4/2005 | Appenzeller et al. | |
| 6,886,101 B2 | 4/2005 | Glazer et al. | |
| 6,886,104 B1 | 4/2005 | McClurg et al. | |
| 6,888,445 B2 | 5/2005 | Gotfried et al. | |
| 6,898,577 B1 | 5/2005 | Johnson | |
| 6,901,154 B2 | 5/2005 | Dunn | |
| 6,901,155 B2 | 5/2005 | Xia et al. | |
| 6,901,266 B2 | 5/2005 | Henderson | |
| 6,901,382 B1 | 5/2005 | Richards et al. | |
| 6,970,584 B2 | 11/2005 | O'Gorman et al. | |
| 6,985,502 B2 | 1/2006 | Bunton | |
| 6,991,174 B2 | 1/2006 | Zuili | |
| 7,287,165 B2 * | 10/2007 | Aono et al. | 713/182 |
| 7,481,364 B2 | 1/2009 | Cannon et al. | |
| 2002/0148892 A1 | 10/2002 | Bardwell | |
| 2002/0158127 A1 | 10/2002 | Hori et al. | |
| 2003/0024994 A1 | 2/2003 | Ladyansky | |
| 2003/0115490 A1 | 6/2003 | Russo et al. | |
| 2004/0035939 A1 | 2/2004 | Lin | |
| 2004/0050933 A1 | 3/2004 | Keronen et al. | |
| 2004/0188519 A1 | 9/2004 | Cassone | |
| 2005/0001028 A1 | 1/2005 | Zuili | |
| 2006/0115134 A1 | 6/2006 | Kozlay | |

FOREIGN PATENT DOCUMENTS

| | | |
|---|---|---|
| EP | 1 473 618 A2 | 11/2004 |
| JP | 11-511278 | 9/1999 |
| JP | 2002-063141 | 2/2002 |
| WO | WO 2004/015620 | 2/2004 |

OTHER PUBLICATIONS

Office Action for Canadian Patent Application No. 2,592,749, mailed on Mar. 10, 2009; 3 pages.

European Search Report for European Application No. 06748689.4, mailed on Oct. 19, 2009; 5 pages.

Office Action for European Application No. 06748689.4, mailed Jun. 16, 2010; 5 pages.

Office Action for European Application No. 06748689.4, mailed Jan. 7, 2011; 4 pages.

Office Action for European Application No. 06748689.4, mailed Jun. 1, 2011.

Office Action for Japanese Patent Application No. 2008-503250, mailed on Aug. 2, 2011.

* cited by examiner

BIOMETRIC IDENTIFICATION DEVICE WITH SMARTCARD CAPABILITIES

RELATED U.S. APPLICATION DATA

This application claims priority to and is a continuation of U.S. patent application Ser. No. 11/389,387, filed Mar. 24, 2006 entitled "Biometric Identification Device with Smartcard Capabilities," which claims priority to U.S. Patent Application No. 60/665,043 filed Mar. 24, 2005, entitled, "Biometric Identification Device with Smartcard Capabilities," each of which is hereby incorporated by reference in their entireties.

BACKGROUND

1. Field of the Invention

This invention relates to the field of portable, electronic personal identification and authentication devices. This invention relates more specifically to electronic devices using biometric and/or smartcard authentication technologies.

2. Related Art

U.S. Pat. No. 6,991,174 to Zuili discloses a method and apparatus for authenticating a shipping transaction. The disclosed apparatus, which is not covered by the claims of the patent, is a portable smartcard reader incorporating a number of different authentication mechanisms, including a personal identification number (PIN), asymmetric cryptographic keys, and/or biometrics. The apparatus may be used autonomously or in conjunction with other electronic devices, such as a personal digital assistant (PDA), cellular telephone, or remote control. The apparatus is designed for use in a variety of applications, including computer networks, televisions and cable access, and payment transactions. The patented invention is a method of specifically authenticating a shipping transaction by using a smartcard and a smartcard reader, acquiring biometric information and shipping information from a customer, encrypting the shipping information using the biometric information, storing the encrypted shipping information on the smartcard and in a database, permitting the customer to access the database in order to change the shipping information, and requiring the customer to resubmit biometric information in order to authenticate the shipping transaction.

U.S. Pat. No. 6,016,476 to Maes, et al., discloses a portable PDA with biometric authentication capability. The PDA is further capable of reading and writing information to smartcards, magnetic stripe cards, optical cards and/or electronically alterable read-only memory (EAROM) cards. The PDA is intended for use in payment transactions, and can communicate with other electronic devices, such as a point of sale terminal, through either wired or wireless transceivers.

Research In Motion, Ltd. (RIM) produces and sells a device called "The BlackBerry® Smart Card Reader," which is a portable smartcard reader that provides two-factor authentication, symmetric cryptographic keys and the smartcard, for users attempting to access or use BlackBerry devices. Once the smartcard and the cryptographic key has been processed on the device, the device communicates via Bluetooth wireless technology with the BlackBerry device, enabling users to transmit secure e-mail. The device does not include biometric authentication.

Key Ovation produces the "Goldtouch ErgoSecure Smart Card and Biometric Keyboard SF2.4." This device is a standard ergonomic computer keyboard, which incorporates both a smartcard reader and an Authentec fingerprint sensor. It is not portable, nor does it appear to possess wireless technology.

NECESSITY OF THE INVENTION

Companies, governments, and other organizations possess a variety of physical and digital resources, which are often valuable and must be protected. Some of these resources are physical, such as particular buildings, offices, or grounds, while others are more intangible, such as databases, computer files, or other digital data. As a natural consequence of wishing to protect the resource, organizations either implicitly or explicitly develop an associated security policy or structure that specifies rules for access to the resource. When an individual wants access to a protected resource, the organization's security policy will—again implicitly or explicitly—require the individual to identify himself in an acceptable manner, and will then authenticate the identified individual against the security policy. If the identified and authenticated individual has privileges to the resource he is permitted access.

Both government agencies and private industry have developed a number of different technologies to implement these security policies. One such technology is the "proximity card," commonly used to secure physical access to commercial buildings and offices. The proximity card is typically the size of a credit card, and contains electronics sufficient to both store and wirelessly transmit a unique identifier to a receiver located at the access point. The proximity card gains its name from its characteristic type of wireless transmission, allowing the user to simply hold the card close (typically within a few inches) to the access point, without inserting the card into a reader. When a proximity card is issued to an individual, a centralized database associates the unique identifier on the card with that individual; when the individual provides the proximity card to gain access to the resource, the identifier is transmitted to the access point, and the association is verified. Once the unique identifier has been programmed onto the proximity card, it cannot be altered, nor can additional data be added to the card.

Developers have been equally prolific in generating authenticating technologies for access to computers, networks, and other digital resources. The simplest examples are passphrases or personal identification numbers (PINs) that the individual must supply before being granted access to the resource. Virtually all e-mail systems are protected this way; another common example is the Windows® log-in process, which prompts the user to enter a username and password. In more advanced systems, individuals may be provided cryptographic keys, such as one half of a public key/private key pair, or a digital certificate. These technologies similarly rest on an individual's previous association with the particular credential, such as the passphrase or cryptographic key.

One technology frequently used to accomplish one or both objectives of physical and digital access is the "smartcard." Similar to the proximity card, the smartcard is in the form-factor of a credit card. The smartcard, however, generally contains a small integrated circuit with sufficient processing power to perform a number of different tasks, including cryptography and two-way transmission. The smartcard can store unique identifiers, such as cryptographic keys, passphrases, and other user data, as well as be transported and used to obtain access to physical resources. One smartcard can provide storage and authentication for a number of different resources, each of which may have a different identifier. Rather than wirelessly transmitting credentials, such as the proximity card, the smartcard uses contact-based transmission, and requires the user to insert the smartcard into a reader at the access point. Smartcard readers may be attached to electronic resources, such as a computer or network terminal, or physical resources, such as doors, gates, etc. Because of the two-way transmission capability, the data stored on a smartcard may be altered or updated through the smartcard reader. Smartcards are extremely popular; for example, the Department of Defense (DoD) currently uses the smartcard-based Common Access Card (CAC) to grant access to its organizations and resources. The CAC retains all of the functions and features of the traditional smartcard, and incorporates a photograph of the bearer on the outside of the card, to allow for both visual and electronic identification and authentication.

Each of these security technologies, while very useful, is susceptible to use by an impostor. If an individual loses his proximity card or smartcard, anyone who picks it up may use it to access the resource. Biometric technology, which authenticates an individual by use of physical characteristics such as fingerprints, can largely eliminate this risk. In the case of fingerprint recognition, an individual's fingerprint is electronically scanned and stored as a numeric template. When the individual wishes to access the resource, the finger is rescanned and digitally compared to the stored fingerprint to determine a match. Biometrics offer a clear advantage over previous technology—while a smartcard may be easily stolen and used by an unauthorized individual, an electronic forgery of a fingerprint is much more difficult to achieve.

The Privaris® BPID™ Security Device is one type of authentication device based on biometric technology, and is much younger technology than the smartcard. The BPID Security Device is a handheld, portable electronic device, containing a fingerprint scanner, two-way wireless communications, memory, and sufficient processing power to perform cryptographic functions and on-device fingerprint authentication algorithms. Much like the smartcard, the BPID Security Device can store unique identifiers, including cryptographic keys and passphrases, and can be used to authenticate an individual to a number of different resources. The BPID Security Device, however, possesses significantly more processing power and memory than the traditional smartcard, in part because of the fingerprint template storage and comparisons done on-board the device. Furthermore, the BPID Security Device is based on wireless technology, so it can use the same protocols as used in proximity cards, newer standards like the Bluetooth® protocol, or both. Data on the BPID Security Device can be transmitted or received without inserting the device into a reader, which, for example, allows individuals to authenticate faster at a physical access point than they could using a smartcard.

Since the advent of the smartcard, a number of organizations have attempted to create an identification system common to multiple organizations that utilized common information contained on the smartcard, while at the same time increasing the security of this information, and insuring positive identification of the individual using the smartcard, prior to granting access to approved resources. Shortage of memory, limited range for contactless applications, the need for multiple cards to accommodate existing building access systems, the need for reliable biometric authentication, and the difficulties associated with updating the data on the card all became issues. While the BPID Security Device can largely address these concerns, it does not possess the form-factor of the smartcard, and therefore does not lend itself to the visual identification component of the CAC. Nor does the BPID Security Device contain a contact-based transmission mechanism allowing it to interact with systems currently using smartcard readers. What is needed is an apparatus and methods that combines the visual identification aspect of the smartcard with the biometric and wireless components of the BPID Security Device, which can allow reversion to a contact-based smartcard system when necessary.

SUMMARY OF THE INVENTION

The present invention discloses apparatuses and methods for integrating smartcard and BPID Security Device technology. The primary apparatus of the invention, hereinafter termed a "smartcard-enabled BPID Security Device," integrates a smartcard reader with the BPID Security Device such that an individual may insert the smartcard into an aperture in the physical enclosure of the BPID Security Device, allowing the smartcard and the BPID Security Device to electronically communicate with each other. In one primary embodiment of the invention, the smartcard-enabled BPID Security Device is based on a custom application specific integrated circuit (ASIC) that incorporates smartcard terminals, such that the BPID Security Device can communicate directly with an inserted smartcard. In an alternative embodiment of the invention, the smartcard-enabled BPID Security Device is based on a commercial off-the-shelf (COTS) microprocessor, and may communicate with a COTS smartcard receiver using a serial, USB, or other type of communication protocol. The first method of the invention is a process for enrolling a user's credentials onto the smartcard-enabled BPID Security Device. The second method of the invention is a process for authenticating an individual using the smartcard-enabled BPID Security Device.

DETAILED DESCRIPTION OF THE INVENTION

The following detailed description is of the best presently contemplated mode of carrying out the invention. This description is not to be taken in a limiting sense, but is made merely for the purpose of illustrating general principles of embodiments of the invention.

In one embodiment, a device (not shown) uses fingerprint biometrics and fingerprint recognition algorithms to authenticate the identity of the owner of the device prior to granting access to an approved resource. The device can store personal identity credentials such as licenses, passports or identification cards, building or facility access codes, credit card or wireless payment information, or user names or passwords. These credentials are wirelessly transmitted from the device upon successful verification of the enrolled user's fingerprint(s) by the device.

The device performs all fingerprint processing, including capture, template generation, storage and matching, on the device. No centralized database of biometric information is needed, which allows the device to provide user authentication to a stand alone computer or handheld device should the infrastructure or network be disabled. Furthermore, the device transmits only the required credential, not the fingerprint or template. The user's biometric information never leaves the device. Thus, users need not be concerned about their fingerprint being compromised or shared in any manner. The device releases private or confidential information only after the user of that device successfully biometrically authenticates him/her self.

In another embodiment, the device can directly interact with a smartcard. The device will be packaged as a holder for the smartcard. All of the features of the device will be maintained, but the physical packaging will be changed. In addition, the device will include an electrical and mechanical interface to a smartcard. The smartcard will slide into the device and make contact with the device. The device will require authentication of its owner prior to the device being able to communicate with the smartcard. Also, the smartcard and the device must authenticate each other before they are capable of communicating with each other. Once the device and the smartcard have authenticated each other they will be able to communicate. Once authenticated, the combined device and smartcard provide all of the capabilities of each technology in a single unit. The combined unit provides for secure storage of credentials, remote reading of a smartcard, wireless transmission of credentials from the smartcard, support of multiple applications (physical access, logical access, identity documents and financial transactions), and coexistence of legacy (smartcard) and emerging (wireless self-contained biometric device) technologies. Users can reap the benefits of both technologies without replacing existing infrastructure.

Figure 1:
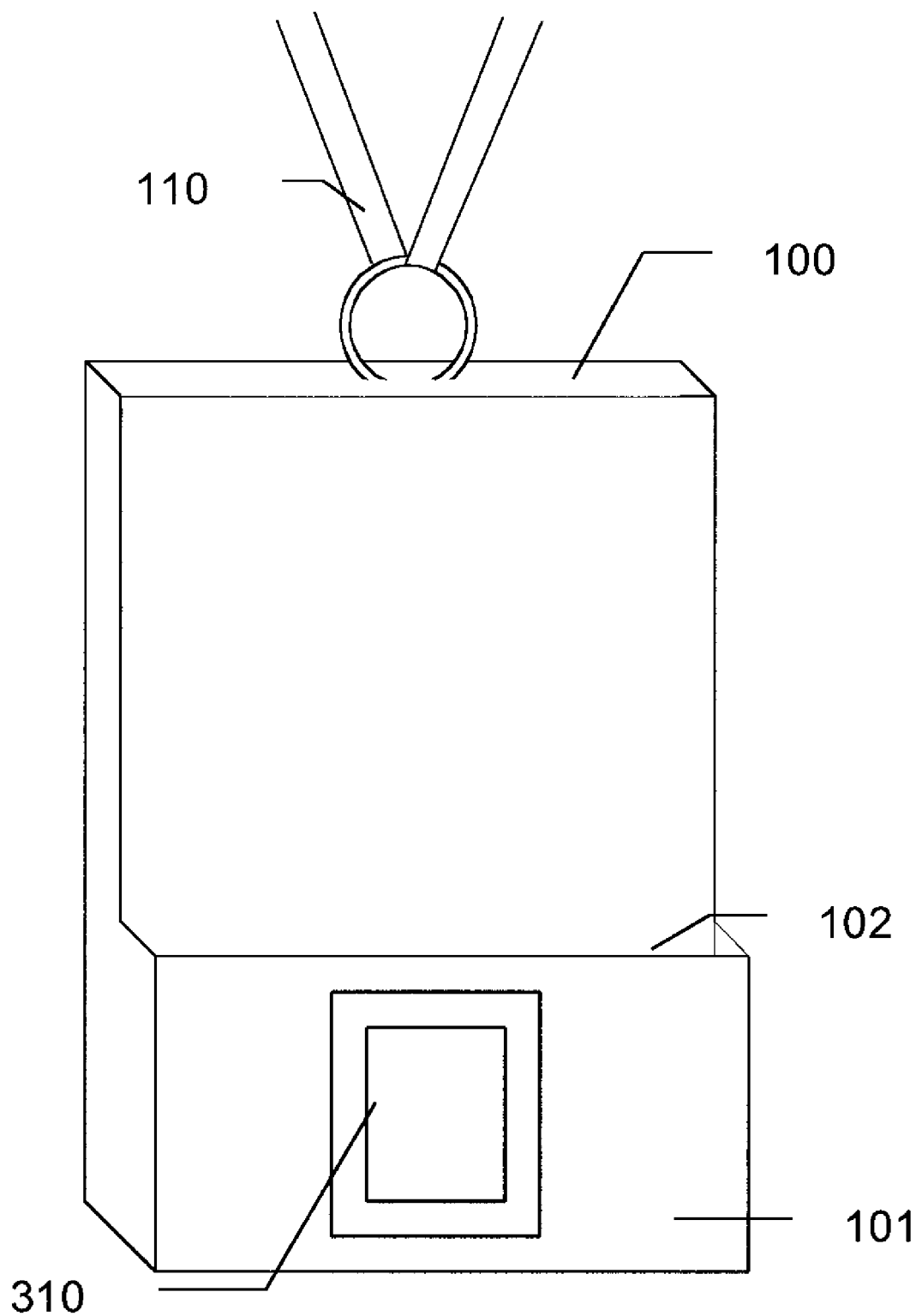
FIG. 1 depicts the smartcard-enabled BPID Security Device
   100—BPID Smartcard Security Device
   101—physical enclosure
   102—aperture for receiving a smartcard
   110—strap
   310—fingerprint sensor of the BPID Security Device
Figure 2:
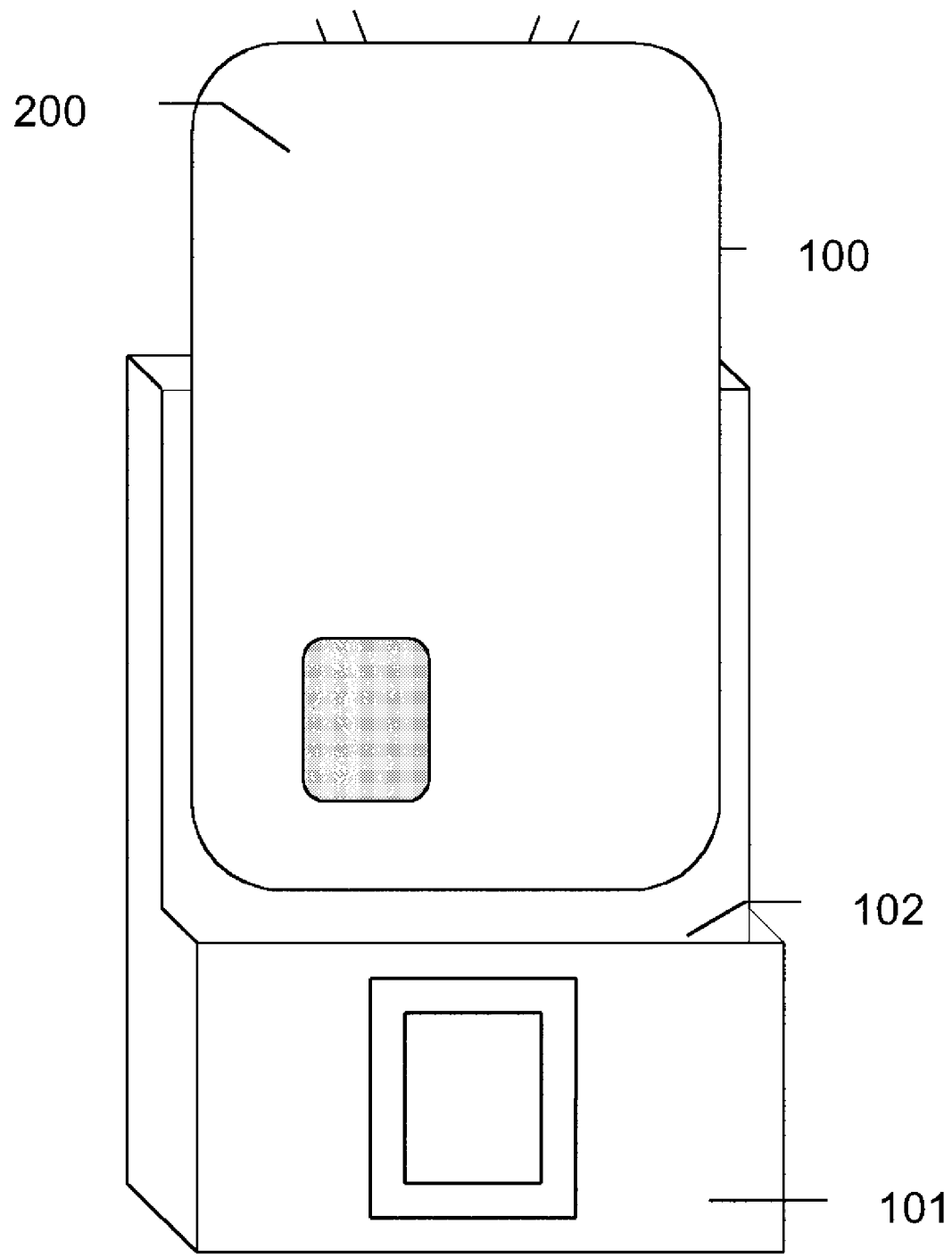
FIG. 2 depicts a smartcard being inserted into the smartcard-enabled BPID Security Device
   100—BPID Smartcard Security Device
   101—physical enclosure
   102—aperture for receiving a smartcard
   200—smartcard
Figure 3:
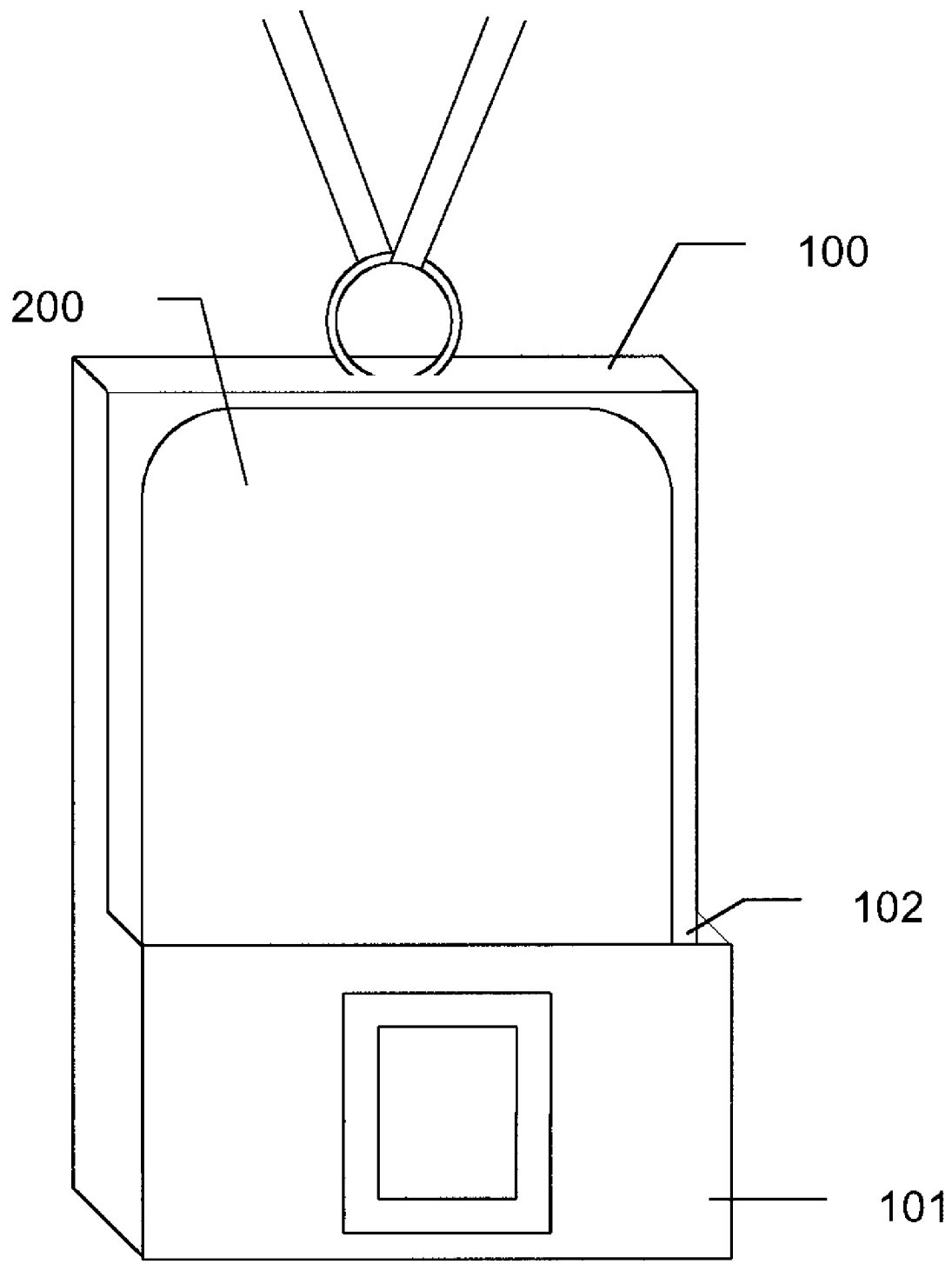
FIG. 3 depicts a smartcard inserted into the smartcard-enabled BPID Security Device
   100—BPID Smartcard Security Device
   101—physical enclosure
   102—aperture for receiving a smartcard
   200—smartcard

The primary apparatus of the invention is called a "smartcard-enabled BPID Security Device." As seen in FIG. 1, the BPID Smartcard Security Device 100 may be attachable to a strap 110, so that it may be worn around an individual's neck or used in some other convenient carrying method. The BPID Smartcard Security Device 100 comprises a physical enclosure 101 with an aperture 102 for receiving a smartcard, a biometric authentication component 300 (see FIG. 4), and a smartcard reader 210 (see FIG. 4). The fingerprint sensor 310 of the BPID Security Device is made externally available through the physical enclosure 101. As seen in FIGS. 2 and 3, the aperture 102 may be oriented in the physical enclosure 101 such that a picture or photograph on the outside of a smartcard 200, such as the CAC, is easily visible to all approaching the individual.

Figure 4:
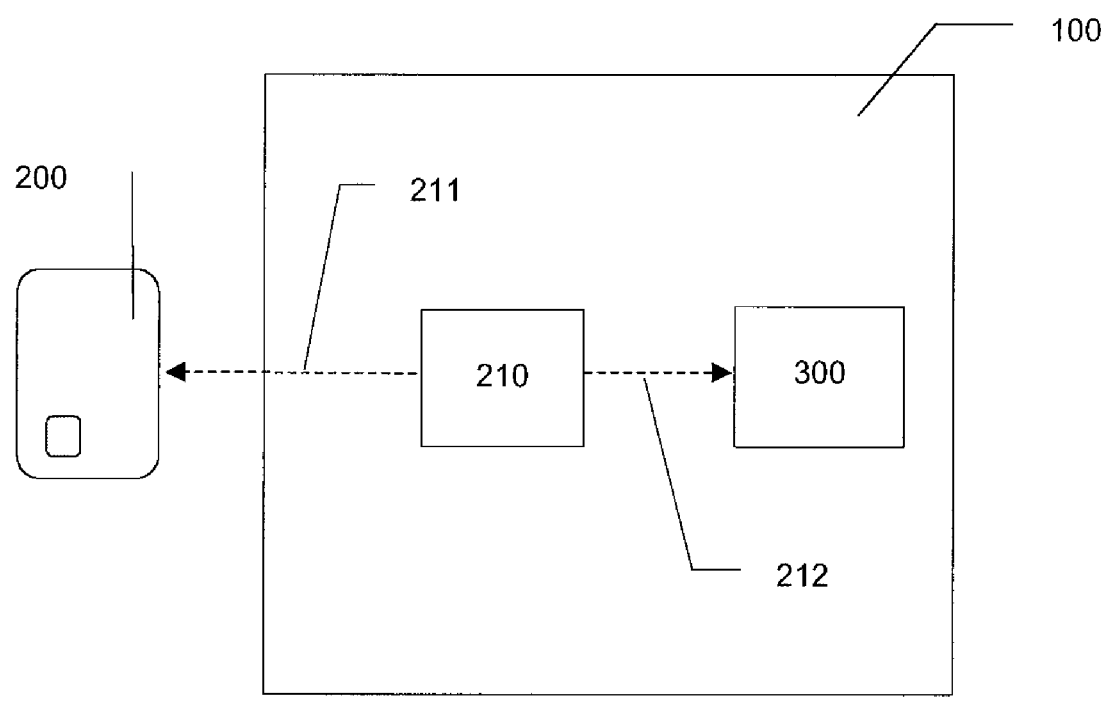
FIG. 4 is a schematic representation of the smartcard-enabled BPID Security Device
   100—BPID Smartcard Security Device
   210—smartcard reader
   211—smartcard terminal
   212—external device terminal
   300—biometric authentication component

FIG. 4 is a schematic representation of the smartcard-enabled BPID Security Device, without the physical enclosure and aperture. The smartcard reader 210 may be any existing technology that incorporates contact-based terminals 211 for receiving and transmitting electronic data smartcards (hereinafter "smartcard terminal"), and at least one additional terminal 212 for transmitting and receiving data to an external device (hereinafter "external device terminal"). The biometric authentication component 300 and the smartcard reader 210 are located within the physical enclosure 101, such that a smartcard 200 inserted into the aperture 102 will physically contact the smartcard terminal 211 and may use existing smartcard protocols to transmit information to and from the smartcard reader 210. The smartcard reader 210 is physically coupled to the biometric authentication component 300, such that the external device terminal 212 allows the smartcard reader 210 to communicate with the biometric authentication component 300.

In the first embodiment of the apparatus, the biometric authentication component 300 may communicate with the external device terminal 212 over a standard communications protocol, such as, but not limited to, RS232 (now known as EIA232) or Universal Serial Bus (USB). In an alternative embodiment of the apparatus, the biometric authentication component 300 and the smartcard reader 210 will coexist on a secure microprocessor (hereinafter "BPID Security Device/reader"), such that communications between the external device terminal 212 and the biometric authentication component 300 will be physically and electronically located on the same ASIC. In this embodiment of the invention, the BPID Security Device/reader will be located within the physical enclosure 101 such that a smartcard 200 inserted into the aperture 102 of the physical enclosure 101 will directly contact the smartcard terminal 211 of the BPID Security Device/reader. This creates enhanced security for the BPID Smartcard Security Device 100, as the ASIC may be physically and electronically secured.

The first method of invention permits an individual with a smartcard to enroll himself into the BPID Smartcard Security Device 100. First, the individual places a smartcard 200 into the aperture 102 of the physical enclosure 101 such that the smartcard 200 contacts the smartcard terminal 211 of the reader 210. The individual then activates power to the smartcard-enabled BPID Security Device 101 and the smartcard reader 210 reads the smartcard's serial number. The smartcard reader 210 transmits the serial number to the biometric authentication component 300 using the external device terminals 212. The biometric authentication component 300 verifies that it has not previously been enrolled with the specific smartcard 200. The biometric authentication component 300 then connects to a BPID Security Device enrollment station and enrolls the individual pursuant to its regular procedure. During the enrollment procedure, the biometric authentication component 300 stores the individual's biometric data and a PIN, which are then associated in the memory of the biometric authentication component 300 with the smartcard's 200 serial number. The biometric authentication component 300 also transmits the individual's biometric data and the PIN to the smartcard reader 210 via the external device terminals 212, and the smartcard reader 210 writes the biometric data and the PIN to the smartcard 200 via the smartcard terminal 211. The BPID Smartcard Security Device 100 is now enrolled and the user may remove the smartcard from the aperture 102 of the physical enclosure 101.

The second method of the invention permits an individual to authenticate himself to a BPID Smartcard Security Device 100 he has previously enrolled in. First, the individual places a smartcard 200 into the aperture 102 of the physical enclosure 101 such that the smartcard 200 contacts the smartcard terminal 211 of the reader 210. The individual then activates power to the smartcard-enabled BPID Security Device 101 and the smartcard reader 210 reads the smartcard's serial number. The smartcard reader 210 transmits the serial number to the biometric authentication component 300 using the external device terminals 212. The biometric authentication component 300 verifies that it has previously been enrolled with the specific smartcard 200 and requests the individual to authenticate himself to the biometric authentication component 300 according to its standard procedure. If the biometric authentication component 300 successfully authenticates the individual, the biometric authentication component 300 locates the PIN associated with the smartcard's 200 serial number and transmits the PIN via the external device 212 to the smartcard reader 210. The smartcard reader 210 then transmits the PIN to the smartcard 200 via the smartcard terminal 211.

If the smartcard 200 possesses "match-on-card" capabilities, i.e. the smartcard is capable of matching fingerprint templates to those stored on the card, the biometric authentication component 300 locates the fingerprint template associated with the smartcard's 200 serial number and transmits the template via the external device 212 to the smartcard reader 210. The smartcard reader 210 then transmits the template to the smartcard 200 via the smartcard terminal 211. If the smartcard 200 matches both the transmitted PIN and fingerprint template to its stored PIN and template, it 200 transmits its stored electronic data to the smartcard reader 210 via the smartcard terminal 211, which subsequently transmits the stored electronic data to the biometric authentication component 300 via the external device terminal 212. The biometric authentication component 300 may now use the electronic data stored on the smartcard 200 as necessary.

If the smartcard 200 does not possess "match-on-card" capabilities, the smartcard 200 will only match the transmitted PIN to its stored PIN. It 200 will then transmit the stored fingerprint template to the smartcard reader 210 via the smartcard terminal 211, which in turn transmits the fingerprint template to the biometric authentication component 300 via the external device terminal 212. The biometric authentication component 300 locates the fingerprint template associated with the smartcard's 200 serial number and compares the stored template to the template transmitted from the smartcard 200. If the two match, the biometric authentication component 300 prompts the smartcard reader 210 to transmit its stored electronic data to the smartcard reader 210 via the smartcard terminal 211. The smartcard reader 210 then transmits the stored electronic data to the biometric authentication component 300 via the external device terminal 212. As above, the biometric authentication component 300 may now use the electronic data stored on the smartcard 200 as necessary.

Those having ordinary skill in the art will recognize that the precise sequence of steps may be altered such that they result in the same functional outcome. Many improvements, modifications, and additions will be apparent to the skilled artisan without departing from the spirit and scope of the present invention as described herein and defined in the following claims.

What is claimed is:

1. An apparatus, comprising:
    a biometric sensor configured to receive a biometric input;
    a physical enclosure with an aperture, the physical enclosure configured to receive a smartcard through the aperture;
    a smartcard reader coupled to the physical enclosure, the smartcard reader being coupled to a smartcard when the smartcard is received in the physical enclosure through the aperture, the smartcard reader being configured to read information from and write information to the smartcard when the smartcard is coupled to the smartcard reader; and
    a processor disposed within the physical enclosure, the processor coupled to the biometric sensor and the smartcard reader, the processor configured to output a biometric template to the smartcard when the biometric input is authenticated by the processor based on the biometric template and when the smartcard is received in the physical enclosure through the aperture such that the biometric template is authenticated by the smartcard.

2. The apparatus of claim 1, wherein the physical enclosure is tamper-evident.

3. The apparatus of claim 1, wherein the physical enclosure is tamper-resistant.

4. The apparatus of claim 1, wherein the aperture of the physical enclosure is oriented such that when the physical enclosure receives the smartcard through the aperture, an external surface of the smartcard is visible.

5. The apparatus of claim 1, wherein the smartcard reader and the processor are implemented on an application-specific integrated circuit such that communications between the smartcard reader and the processor are secure and tamper-resistant.

6. The apparatus of claim 1, wherein the smartcard reader and the processor are configured to communicate using serial communications.

7. The apparatus of claim 1, wherein the smartcard reader and the processor are configured to communicate using a Universal Serial Bus.

8. The apparatus of claim 1, wherein the biometric template is a first biometric template, the apparatus further comprising:
    a memory coupled to the processor, the memory configured to store the first biometric template,
    the processor being configured to produce a second biometric template based on the biometric input and configured to authenticate the second biometric template based on the first biometric template, the processor configured to authenticate the biometric input when the second biometric template is authenticated.

9. An apparatus, comprising:
    a housing configured to receive at least a portion of a smartcard;
    a biometric sensor coupled to the housing, the biometric sensor configured to receive a biometric input;
    a memory coupled to the housing, the memory configured to store a biometric template; and
    a processor disposed within the housing, the processor coupled to the biometric sensor and the memory, the processor configured to send to the smartcard an identifier associated with the smartcard when the biometric input is authenticated by the processor based on the biometric template and when at least the portion of the smartcard is received within the housing such that the apparatus is authenticated by the smartcard based on at least one of the identifier or the biometric template, the processor configured to inhibit communication with the smartcard when the smartcard has not been previously enrolled with the processor.

10. The apparatus of claim 9, wherein the processor is configured to produce a biometric template based on the biometric input.

11. The apparatus of claim 9, wherein the processor is configured to authenticate a biometric input based on the biometric template.

12. The apparatus of claim 9, wherein the processor is configured to produce the identifier based on a serial number of the smartcard.

13. The apparatus of claim 9, wherein the processor is configured to inhibit the biometric template from being output outside of the apparatus.

14. The apparatus of claim 9, wherein the processor is configured to send to the smartcard the biometric template such that the biometric template is authenticated by the smartcard based on a biometric template stored at the smartcard.

15. The apparatus of claim 9, wherein the processor is configured to produce the biometric template.

16. A method, comprising:
    storing, at a personal identification device, a biometric template of a user such that the biometric template is inhibited from being output from the personal identification device;
    receiving, at the personal identification device, a smartcard associated with the user;
    authenticating, at the personal identification device, a biometric input of the user based on the biometric template of the user; and
    outputting electronic data stored at the smartcard after the receiving smartcard is received at the personal identification device and after the authenticating biometric input of the user is authenticated at the personal identification device.

17. The method of claim 16, further comprising:
    producing, at the personal identification device, the biometric template of the user.

18. The method of claim 16, further comprising:
    sending, from the personal identification device, to the smartcard an identifier associated with the smartcard when the biometric input of the user is authentic such that the smartcard is configured to authenticate the personal identification device based on the identifier.

19. The method of claim 16, further comprising:
    authenticating, at the personal identification device, the smartcard based on a serial number of the smartcard before the outputting.

20. The method of claim 16, further comprising:
    receiving from the smartcard a biometric template of the user; and
    authenticating the biometric template of the user received from the smartcard based on the biometric template of the user stored at the personal identification device.

21. The method of claim 16, further comprising:
    sending, from the personal identification device, to the smartcard the biometric template when the biometric input of the user is authentic such that the smartcard is configured to authenticate the user based on the biometric template.

22. The method of claim 16, further comprising:
    verifying that the smartcard has been previously enrolled with the personal identification device before the outputting.

23. The method of claim 16, further comprising:
    receiving from the smartcard electronic data of the user after the authenticating.

24. The method of claim 16, wherein the biometric template is a first biometric template, the authenticating includes:
    producing, at the personal identification device, a second biometric template based on the biometric input; and
    authenticating, at the personal identification device, the second biometric template based on the first biometric template.

25. A method, comprising:
    receiving, at a personal identification device, a smartcard;
    receiving, at the personal identification device, from the smartcard, a biometric template of the user; and
    verifying the smartcard has been previously enrolled with the personal identification device based on a serial number associated with the smartcard;
    after the verifying, authenticating, at the personal identification device, the biometric template of the user based on a stored biometric template of the user; and
    prompting the smartcard to transmit electronic data stored at the smartcard when the biometric template of the user is authentic, the stored biometric template being stored at the personal identification device.

26. The method of claim 25, further comprising:
    receiving, at the personal identification device, a biometric input of the user; and
    authenticating, at the personal identification device, the biometric input of the user received at the personal identification device based on one of the stored biometric template or the biometric template received from the smartcard before the authenticating the biometric template.

27. The method of claim 25, further comprising:
    producing, at the personal identification device, the stored biometric template before the authenticating.

28. The method of claim 25, further comprising:
    sending to the smartcard an identifier associated with a serial number associated with the smartcard such the identifier is authenticated by the smartcard.

* * * * *